United States Patent [19]
Ponzio

[11] Patent Number: 6,032,897
[45] Date of Patent: Mar. 7, 2000

[54] APPARATUS AND METHOD FOR DRIVING A WINDING HEAD OF A STATOR WINDING MACHINE

[75] Inventor: Massimo Ponzio, Barberino V. Elsa, Italy

[73] Assignee: Atop S.P.A., Barberino Val D'Elsa, Italy

[21] Appl. No.: 09/102,646

[22] Filed: Jun. 23, 1998

[30] Foreign Application Priority Data

Jun. 23, 1997 [IT] Italy ................... PI97A0037

[51] Int. Cl.[7] .............................................. H02K 15/085
[52] U.S. Cl. .......................................... 242/432.4; 74/837
[58] Field of Search .................... 74/837, 603, 604, 74/590; 242/432.3, 432.4, 432.5

[56] References Cited

U.S. PATENT DOCUMENTS

| | | | |
|---|---|---|---|
| 3,112,657 | 12/1963 | Huck | 74/590 |
| 4,158,314 | 6/1979 | Finegold. | |
| 4,361,056 | 11/1982 | George. | |
| 4,791,830 | 12/1988 | Yamamoto et al. | 74/603 |
| 4,914,977 | 4/1990 | Kato | 74/603 |
| 5,201,267 | 4/1993 | Porucznik et al. | 74/604 |
| 5,526,993 | 6/1996 | Hamada | 242/432.4 |
| 5,560,554 | 10/1996 | Miyawaki et al. | |

Primary Examiner—Katherine A. Matecki
Attorney, Agent, or Firm—Browdy and Neimark

[57] ABSTRACT

An apparatus and method for driving a winding head of a stator winding machine. The winding head is the end of a winding shaft which reciprocates and oscillates. The reciprocation of the winding shaft (5) is driven by rocking drive means (13) connected to motor means (10) and comprises means for balancing comprising at least two counter rotating counterweights (26, 31) which rotate about a driving shaft (12) in planes parallel to the axis of the wire winding shaft (5). The rocking drive means comprise a bar (22), orthogonal to the wire winding shaft (5) and to the driving shaft (12), which has a component of motion parallel to the wire winding shaft (5). The reciprocation stroke (8) and the balancing of the apparatus can be carried out with an easy operation from the outside (39) by means of a tooling, manual or automatic.

16 Claims, 3 Drawing Sheets

APPARATUS AND METHOD FOR DRIVING A WINDING HEAD OF A STATOR WINDING MACHINE

FIELD OF THE INVENTION

The present invention relates to a stator winding machine for electric motors.

More precisely, the invention relates to a method for driving a winding head of a stator winding machine, such head comprising a wire winding shaft with adjustable stroke.

Moreover, the invention relates to an apparatus for driving such a winding head.

DESCRIPTION OF THE PRIOR ART

Many types of electric motors stators have coils of electrically insulated lead wire wound about poles protruding in recesses of a shaped body formed by a pack of metal layers. The wire winding step, according to a well known technique, is carried out by a winding head comprising a winding hollow shaft through which the wire slides. The wire enters the hollow shaft at one of its ends after having been unwound in a braked way from a reel and exits at its other end through one or more wire guiding needles. The hollow shaft motion comprises a reciprocation parallel to the axis of the stator and an oscillation about the axis of the shaft, so that the needles follow a substantially elliptical path and are capable of winding the wire about the poles of the stator.

The wire laying step in the recesses of the stator is aided by wire guiding shrouds of known type. The path followed by the wire out of the needles, whose motion is substantially elliptical, is, then, tangential to the wire guiding shrouds which lay the wire into the recesses provided for about the poles.

In some cases, as described in EP0538905, instead of needles integral to the end of the hollow shaft, needles are provided for having an independent motion from each other and driven by means of rods coaxial to the hollow shaft. This way, the wire guiding shrouds can be omitted, even if a more complex driving mechanism is necessary.

The reciprocation and oscillation of the winding apparatus, synchronised to each other and, normally, operated by a single rotor through mechanic drive and gears in particular, for the reciprocation, a crank gear drive is known, for example described in U.S. Pat. Nos. 4,158,314 and 5,560,554. Alternatively, a crank and slotted link described in the above cited EP0538905 is also known, which transforms the rotation of a driving shaft into a reciprocation of the hollow shaft. On the other hand, concerning the oscillation of the hollow shaft, a rocking lever drive is commonly used, an end of which is driven by a cam gear operated by the driving shaft, whereas the other end has a ring gear portion which engages with a pinion coaxial to the hollow shaft.

One of the main problems of the known kinematic apparatus is the quick adjustment of the reciprocation stroke of the hollow shaft. In particular, the adjustment, which should be carried out without opening every time the machine, is necessary because stators must be wound with different pack height, which is substantially equal to the longitudinal diameter of the elliptical path of the needles. Since, therefore, the stators, which in order to be wound are carried by automatic conveyors which bring them in succession to the winding machine automatic, cannot have the same pack height, require, thus, a quick adjustment of the stroke of the hollow shaft.

However, on one hand there is the main problem to quickly adjusting the reciprocation stroke, by changing the lever arms of the reciprocating elements using external controls, and on the other hand there is the problem of balancing the inertial counterweights thereof. Moreover, the higher the oscillating frequency, which is equal to the number of turns wound in a time unit, the more is this problem complicated and hard.

The stator winding machines described in the above cited documents are all provided with kinematic apparatus capable of adjusting the stroke quickly and, in some cases, of carrying out the balancing at the same time. In them, the problem of the adjustment of the reciprocation stroke has been solved successfully, in several different ways. On the other hand, these known devices do not carry out satisfactorily a balancing of the inertial counterweights. In fact, only some components of the rocking eccentrical forces are balanced, i.e. the forces parallel to the axis of the hollow shaft, whereas the moments of the rocking forces are not balanced, and sometimes worsened, as in EP0538905. This causes high noises and seriously limits the top working speed, owing to the strong vibration rising at the increase of the winding speed.

It is, therefore, the object of the present invention to provide a stator winding machine which is equipped with a winding head driving apparatus whose stroke is quickly adjustable, and wherein the rocking forces can be balanced as well as the moments of these forces can be minimised.

It is another object of the present invention to provide such a machine in which an easy operation from the outside of the adjustment controls of the reciprocation is possible both to adjust the stroke and to carry out the balancing.

It is, also, the object of the present invention that such a machine has rocking inertial counterweights whose moments are less than in the prior art.

A further object of the present invention is to provide a method for balancing the rocking forces and their moments in an apparatus for driving with adjustable stroke the reciprocation of the hollow shaft of a stator winding machine.

SUMMARY OF THE INVENTION

These and other objects are achieved by the apparatus and method for driving a winding head of a stator winding machine according to the invention.

According to first aspect, the winding machine, in which the reciprocation of the hollow shaft of the winding head is driven by rocking drive means connected to motor means, means are provided for balancing the rocking drive means comprising at least two counter rotating counterweights. These counterweights, preferably, rotate according to planes parallel to the axis of the hollow shaft and are brought into rotation by a driving shaft to which said rocking drive means are connected in a way eccentrically adjustable.

In particular, a first counterweight of said two counter rotating counterweights rotates integral to the driving shaft and has eccentricity opposite to the rocking drive means, whereas the second counterweight is integral to a coaxial shaft coaxial and counter rotates with respect to the driving shaft.

According to another aspect of the invention, the rocking drive means comprise a bar orthogonal to the hollow shaft and to the driving shaft, said bar having a component of motion parallel to the hollow shaft.

Concerning to the method for balancing, it has the characteristics of:

providing a first counterweight which rotates along with rocking drive means in a first plane parallel to the hollow shaft and opposite to the rocking drive means with respect to the driving shaft, and providing a second counterweight which rotates in a second plane parallel to said first plane, but in a counter rotating way.

Advantageously, the stroke adjustment step is carried out contemporaneously shifting the rocking drive means from/towards the driving shaft, the first counterweight from/towards the rocking drive means and the second counterweight counter rotating from/towards the driving shaft.

BRIEF DESCRIPTION OF THE DRAWINGS

Further characteristics and advantages of the stator winding apparatus and method according to the invention will be made clearer with the following, but not limitative, exemplifying description with reference to the attached drawings, wherein.

DESCRIPTION OF A PREFERRED EMBODIMENT

Figure 1:
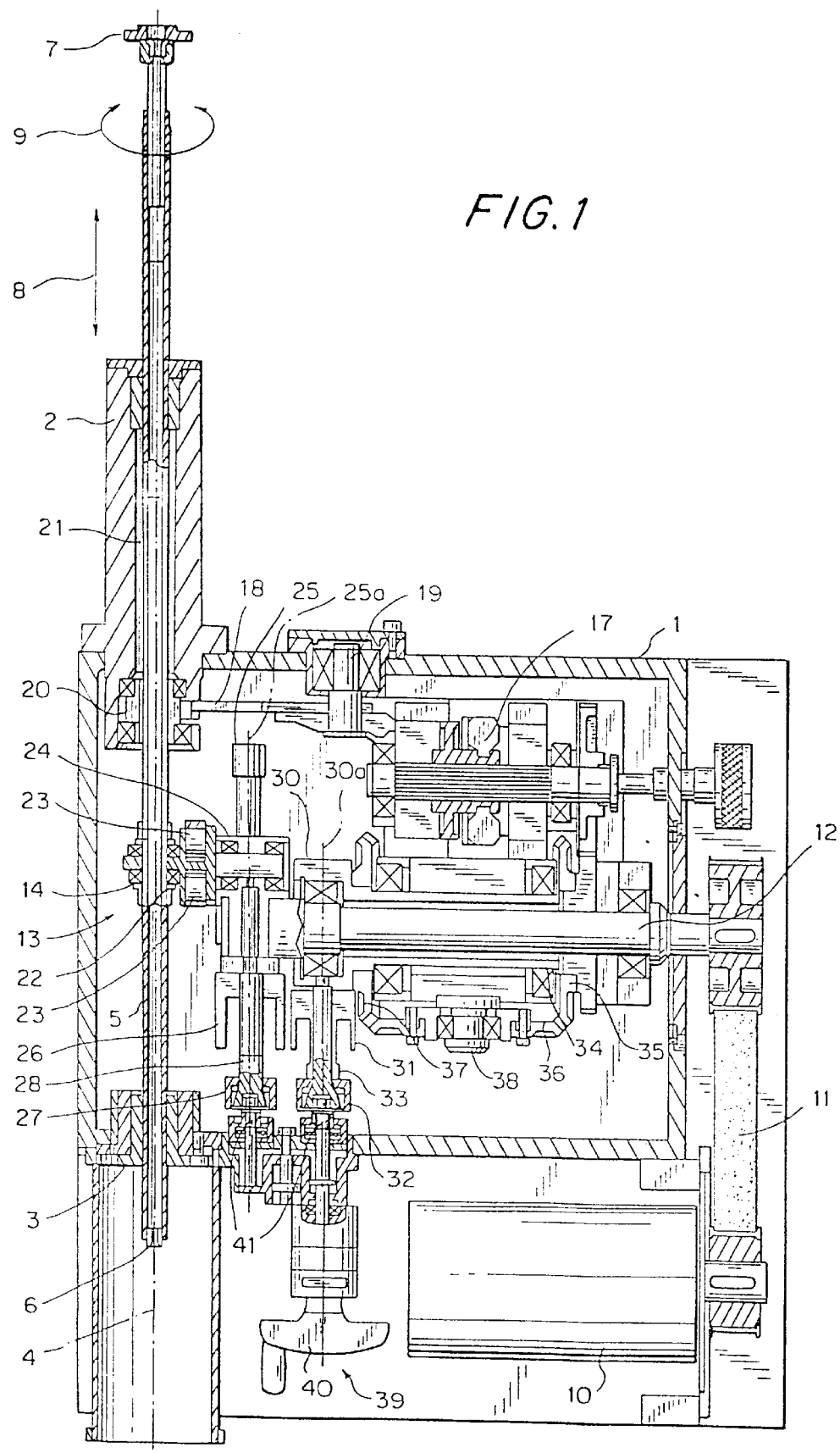
FIG. 1 shows a top plan partially cross sectioned view of a stator winding machine according to the present invention.

With reference to the above referenced figures, a stator winding machine, operating with the method and equipped with the apparatus according to the present invention, comprises a box 1 having two supports 2 and 3 in which a winding head comprising a hollow shaft 5 which slides longitudinally along axis 4 and rotates about axis 4. Shaft 5 has an end having an inlet 6 for the lead wire and at the other end has two opposite outlet needles 7 oriented orthogonally to axis 4.

Hollow shaft 5 reciprocates according to arrows 8 and oscillates according to arrows 9, respectively longitudinally to and about axis 4.

The winding machine is operated by a motor 10, which, by means of a belt 11, rotates a driving shaft 12 which has, at its end opposite to belt 11, rocking drive means 13 which engage with a sleeve 14 integral to hollow shaft 5.

The oscillation according to arrows 9 is obtained through a secondary shaft 17 which operates, by means of not shown cam means, a toothed rocking lever 18 rotatable about a pivot 19 and which causes a pinion 20 to oscillate, which engages with a grooved portion 21 of hollow shaft 5.

Figure 2:
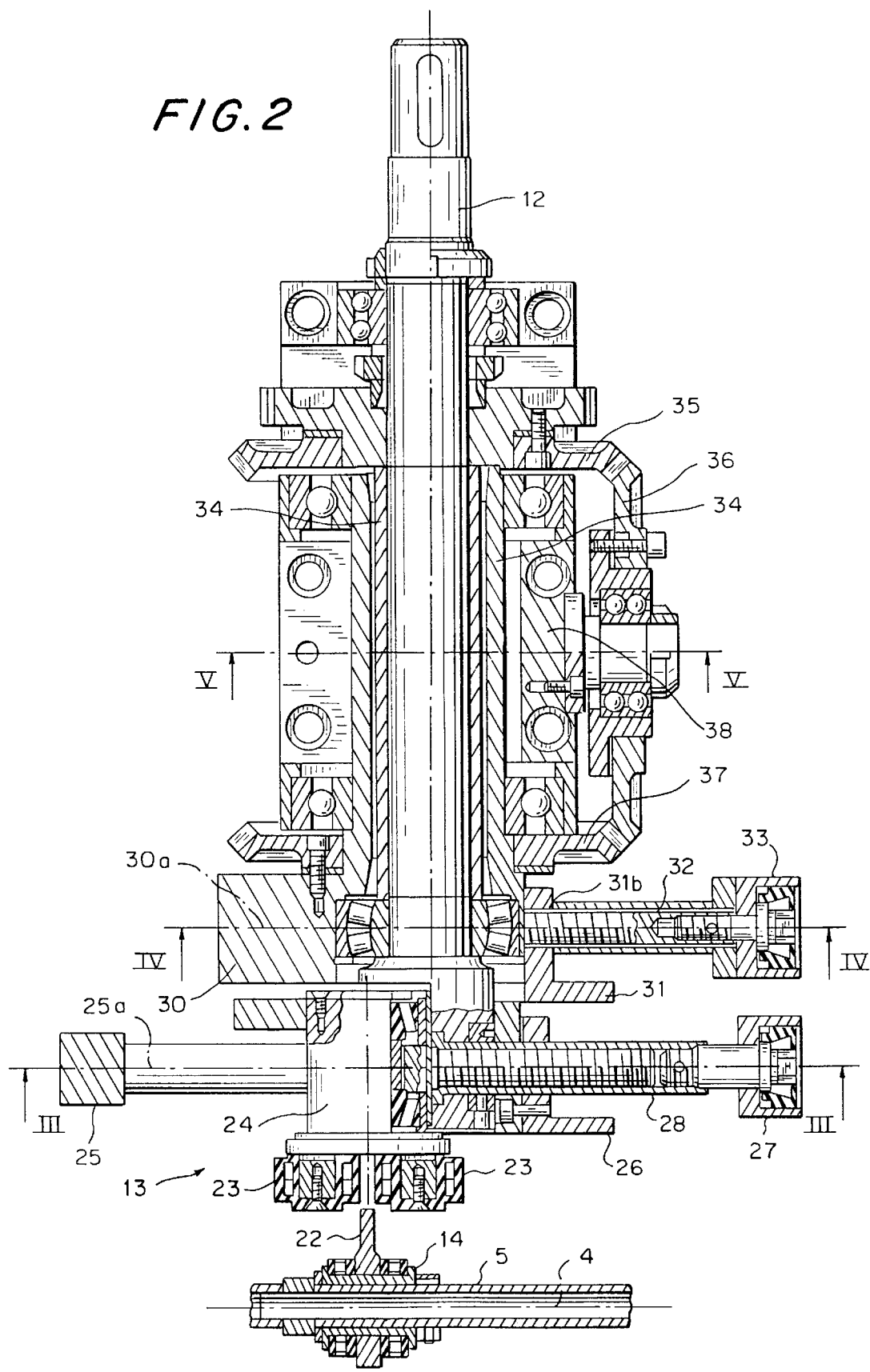
FIG. 2 shows a cross sectional view of the balancing assembly of the rocking drive means of the machine of FIG. 1.
Figure 3:
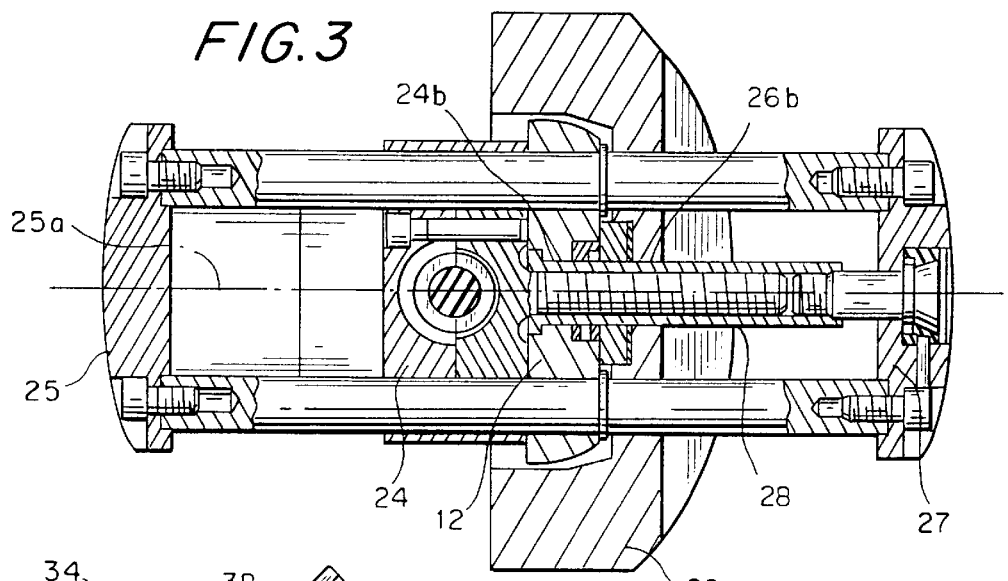
FIGS. 3, 4 and 5 show the assembly of FIG. 2 respectively cross sectioned according to arrows III—III, IV—IV and V—V.
Figure 4:
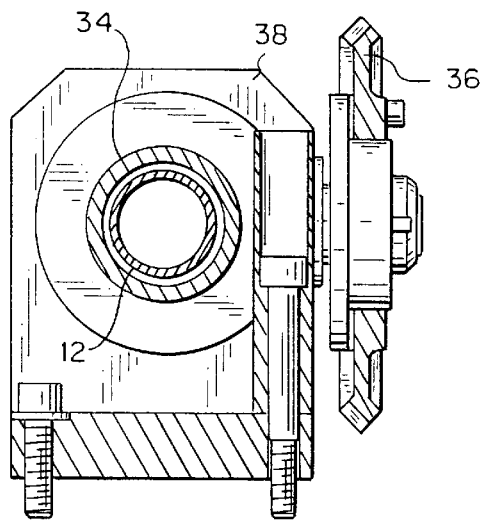
Figure 5:
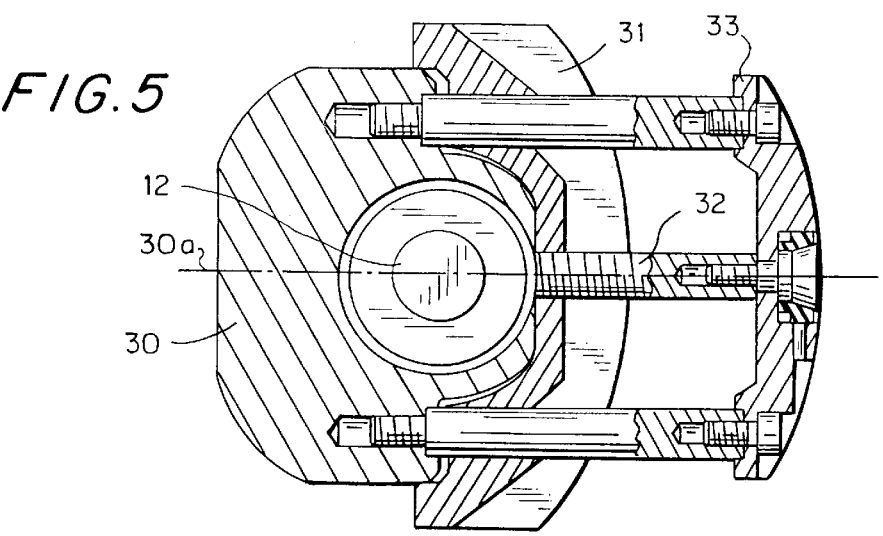

With reference to FIG. 2 and to the cross sectional view of FIGS. 3, 4 and 5, the rocking drive means 13 comprises a bar 22 integral to sleeve 14 and extending orthogonally to both hollow shaft 5. With bar 22 two rows of rollers 23 engage, rotatably mounted on an eccentric support 24. The latter belongs to a first flywheel 25 integral to the driving shaft 12 and comprises a first counterweight 26, opposite to the eccentric support 24 with respect to the axis the driving shaft 12. Flywheel 25 has, moreover, an adjusting head 27 integral to a screw 28 which engages both with a nut screw 26b (see FIG. 3) made in counterweight 26 and, through a screw threaded portion of opposite direction, with a nut screw 24b (see FIG. 3) belonging to eccentric support 24. Flywheel 25 rotates in a plane 25a parallel to hollow shaft 5 and orthogonal to driving shaft 12.

A second flywheel 30 is provided which rotates in a plane 30a, parallel to plane 25a and has a second counterweight 31 with a nut screw 31b in which an adjustment screw 32 with an adjustment head 33 engages. Flywheel 30 is integral to a shaft 34 coaxial to the driving shaft 12 but counter rotating with respect to the latter through bevel gears drive. This drive comprises bevel gears 35, 36 and 37 respectively integral to the driving shaft 12, pivoted on a fixed support 38 of box 1, and integral to coaxial shaft 34. The gear ratio is chosen so that the motion of the second flywheel 30 is opposite to that of the first flywheel 25.

An adjustment device 39 (FIG. 1), which can be operated by a handle 40 or, alternatively, automatically, has two spanners 41 which engage with adjustment heads 27 and 32, respectively of the first and of the second flywheel 25 and 30, when they are still and aligned to each other, as shown in FIG. 2.

More precisely, the rotation of adjustment head 27 of flywheel 25 causes first counterweight 26 and eccentric support 24 to move towards/away from each other, zeroing the resultant of the centrifugal forces parallel to axis 4. The rotation of head 32, on the other hand, causes a shifting of the second counterweight 31 towards/away from the driving shaft 12 axis, creating an alternate centrifugal force whose moment with respect to a neutral axis of the rocking forces parallel to the axis 4 makes zero the alternate forces and minimises the moment of the resultant of the rocking forces.

Obviously, the pitch of screws 28 and 33 is chosen after a calculus easy for a skilled man, so that, for every position of the eccentric support 24, corresponding to a particular reciprocation stroke 8 of needles 7, the balance conditions of the rocking forces and of the moments of the rocking forces are fulfilled. The choice of counterweights 26 and 31 is made roughly by means of mathematical calculus and, then, calibrated when the winding machine is tested by means of known balancing apparatus.

The amount of the rotation of spanners 41 of the adjustment device 39 (FIG. 1), when this is pushed against heads 27 and 32, is proportional to the reciprocation stroke adjustment of hollow shaft 5.

When, through needles 7 and hollow shaft 5, lead wire must be laid in the in the recesses of a stator having a determined pack height, it is sufficient, by means of the adjustment device 40, to rotate heads 28 and 32 of the flywheels 25 and 30 respectively, which, automatically, are always aligned when the driving shaft 12 stops.

If the winding machine is winding groups of stators having the same pack height, it is sufficient that, at every height change, when the driving shaft is still, the adjustment device 40 is operated manually. If, on the other hand, the machine has to be more flexible, i.e. winding stators having different pack height in succession, the adjustment device 40 is replaced by an equivalent automatic device operated in a known way by the computer which controls the winding machine.

Concerning, finally, the rocking drive means 13, the presence of bar 22 is particularly advantageous since the counterweight of the rocking forces which are integral to the hollow shaft 5 is minimised. In fact, the eccentric support 24, which carries the rollers 23 and is heavier than bar 22, belongs to flywheel 25, is substantially closed to the neutral axis of the rocking forces, and is a rocking mass compensated by counterweight 26, thus reducing the overall moments of the resultant of the rocking forces that this second counterweight 31 has to compensate.

Obviously, alternatively to the bar 22 and rollers 23 assembly, it is possible to use other equivalent assemblies capable of turning a rotation into an adjustable stroke reciprocation.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

I claim:

1. Stator winding machine for winding an electric motor stator with lead wire, comprising an axially hollow shaft having an axis aligned with the stator being wound, said shaft having an inlet end for said lead wire and an outlet end for said lead wire to be wound on said stator, rocking drive means for reciprocation of said shaft along said axis according to a predetermined stroke, means for oscillation of said shaft about said axis, motor means for driving said reciprocation and oscillation, means for balancing said rocking drive means and means for adjusting said stroke, wherein said means for balancing comprise at least two counterweights and means for causing said counterweights to rotate in opposite directions to each other.

2. Stator winding machine according to claim 1, wherein said counterweights each comprise at least a weight and means for translating said weight on a plane parallel to said axis.

3. Stator winding machine according to claim 1, wherein a driving shaft substantially orthogonal to said axis is provided to which said rocking drive means are eccentrically connected, said means for adjusting said reciprocation comprising means for adjusting the eccentricity of said rocking drive means with respect to said driving shaft.

4. Stator winding machine according to claim 3, wherein said rocking drive means comprise a bar orthogonal to said hollow shaft and to said driving shaft, said bar having a component of motion parallel and one orthogonal to said axis, said bar being orthogonal to said axis and to said driving shaft.

5. Stator winding machine according to claim 1, wherein a driving shaft substantially orthogonal to said axis is provided to which said rocking drive means are eccentrically connected, said counterweights comprising a first counterweight rotating integral to said driving shaft and a second counterweight counter rotating with respect to said driving shaft.

6. Stator winding machine according to claim 1, wherein a driving shaft substantially orthogonal to said axis is provided, a first flywheel being provided integral to said driving shaft comprising a first counterweight and said rocking drive means, said first counterweight and said rocking drive means being located eccentric with respect to said driving shaft and opposite to each other with respect to said driving shaft, eccentricity adjusting means being provided on said first flywheel translating said rocking drive means and said first counterweight with respect to said driving shaft.

7. Stator winding machine according to claim 1, wherein a driving shaft substantially orthogonal to said axis is provided to which said rocking drive means are eccentrically connected, wherein a counter rotating shaft coaxial to said driving shaft as well as a second flywheel integral to said counter rotating shaft comprising said second counterweight are provided, means being provided on said second flywheel for adjusting the eccentricity of said second counterweight with respect to said driving shaft.

8. Stator winding machine according to claim 7, wherein said eccentricity adjusting means on said first flywheel and said means for adjusting the eccentricity with respect to said driving shaft of said second counterweight on said second flywheel can be aligned to each other when said driving shaft is still, an external actuating device being provided engaging with said aligned means for adjusting.

9. Stator winding machine for winding an electric motor stator with lead wire, comprising an axially hollow shaft having an axis aligned with the stator being wound, said shaft having an inlet end for said lead wire and an outlet end for the lead wire being wound on said stator, rocking drive means being provided for reciprocation of said shaft along said axis according to a predetermined stroke, means being provided for oscillation of said shaft about said axis, motor means being provided for driving said reciprocation and oscillation, means being provided for balancing said rocking drive means and means being provided for adjusting said stroke, said rocking drive means being eccentrically connected to a driving shaft substantially orthogonal to said axis, wherein said rocking drive means comprise a bar orthogonal to said hollow shaft and to said driving shaft, said bar moving parallel to said hollow shaft and sliding orthogonally to said axis and to said driving shaft.

10. Method for balancing a stator winding machine comprising an axially hollow shaft having an axis aligned with a stator being wound by the machine, said shaft having an inlet end for said lead wire and an outlet end for the lead wire being wound on said stator, rocking drive means being provided for reciprocation of said shaft along said axis according to a predetermined stroke, means being provided for oscillation of said shaft about said axis, motor means being provided for driving said reciprocation and oscillation, means being provided for balancing said rocking drive means and means being provided for adjusting said stroke, said rocking drive means being provided for adjusting said stroke, said rocking drive means being eccentrically connected to a driving shaft substantially orthogonal to said axis wherein the method comprises the steps of:

moving said rocking drive means with respect to said driving shaft for adjusting said stroke, balancing said rocking drive means by moving a first counterweight with respect to said driving shaft opposite to said rocking drive means, and further balancing said rocking drive means by a second counterweight which rotates about said driving shaft in a second plane parallel to said first plane but in a way counter to rotation of said first counterweight, and moving said second counterweight with respect to said driving shaft.

11. Method for balancing a stator winding machine according to claim 10, further comprising the step of adjusting said stroke reciprocation by varying contemporaneously the distance of said rocking drive means w.r.t. said driving shaft, said first counterweight w.r.t. said rocking drive means, and said second counterweight w.r.t. said driving shaft.

12. Stator winding machine for winding an electric motor stator with lead wire, comprising an axially hollow shaft having an axis aligned with the stator being wound, said shaft having an inlet end for said lead wire and an outlet end for the lead wire to be wound on said stator, rocking drive means for reciprocation of said shaft along said axis according to predetermined stroke, means for oscillation of said shaft about said axis, motor means for driving said reciprocation and oscillation, means for balancing said rocking drive means and means for adjusting said stroke, wherein said means for balancing comprise at least two counterweights and means for causing said counterweights to rotate in opposite directions to each other;

wherein a driving shaft substantially orthogonal to said axis is provided to which said rocking drive means are eccentrically connected, said counterweights comprising a first counterweight rotating integral to said driving shaft and a second counterweight counter rotating with respect to said driving shaft.

13. Stator winding machine according to claim 12, wherein a driving shaft substantially orthogonal to said axis is provided, a first flywheel being provided integral to said driving shaft comprising a first counterweight and said rocking drive means, said first counterweight and said rocking drive means being located eccentric with respect to said driving shaft and opposite to each other with respect to said driving shaft, eccentricity adjusting means being provided on said first flywheel translating said rocking drive means and said first counterweight with respect to said driving shaft.

14. Stator winding machine according to claim 12, wherein a driving shaft substantially orthogonal to said axis is provided to which said rocking drive means are eccentrically connected, wherein a counter rotating shaft coaxial to said driving shaft as well as a second flywheel integral to said counter rotating shaft comprising said second counterweight are provided, means being provided on said second flywheel for adjusting the eccentricity of said second counterweight with respect to said driving shaft.

15. Stator winding machine according to claim 14, wherein said eccentricity adjusting means on said first flywheel and said means for adjusting the eccentricity with respect to said driving shaft of said second counterweight on said second flywheel can be aligned to each other when said driving shaft is still, an external actuating device being provided engaging with said aligned means for adjusting.

16. Stator winding machine according to claim 12, wherein a driving shaft substantially orthogonal to said axis is provided to which said rocking drive means are eccentrically connected, said means for adjusting said reciprocation comprising means for adjusting the eccentricity of said rocking drive means with respect to said driving shaft, wherein said rocking drive means comprise a bar orthogonal to said hollow shaft and to said driving shaft, said bar having a component of motion parallel and one orthogonal to said axis, said bar being orthogonal to said axis and to said driving shaft.

\* \* \* \* \*